United States Patent [19]

Suzuki et al.

[11] 4,210,848

[45] Jul. 1, 1980

[54] THIN-FILM EL DISPLAY PANEL WITH LIGHT-ACTIVATED WRITE AND ERASE MEANS

[75] Inventors: Chuji Suzuki, Nara; Masahiro Ise, Tenri; Kenzo Inazaki, Tenri; Katsuyuki Machino, Tenri, all of Japan

[73] Assignee: Sharp Kabushiki Kaisha, Osaka, Japan

[21] Appl. No.: 925,973

[22] Filed: Jul. 19, 1978

[30] Foreign Application Priority Data

Jul. 20, 1977 [JP] Japan .................................. 52-87767
Aug. 17, 1977 [JP] Japan .................................. 52-99000
Sep. 6, 1977 [JP] Japan .................................. 52-107424

[51] Int. Cl.² ..................... H05B 37/00; H05B 39/00; H05B 41/00
[52] U.S. Cl. .................................. 315/169.3; 340/781
[58] Field of Search ..................... 315/169 R, 169 TV; 340/324 M; 365/110, 111, 112

[56] References Cited

U.S. PATENT DOCUMENTS 3,975,661 8/1976 Kanatani et al. ............. 315/169 TV

OTHER PUBLICATIONS

Topics in Applied Physics—Electroluminescence, vol. 17, edited by J. I. Pankove, Springer-Verlag, 1977, pp. 197-210.
Electronics, Jul. 6, 1978, p. 33.

*Primary Examiner*—Alfred E. Smith
*Assistant Examiner*—Robert E. Wise
*Attorney, Agent, or Firm*—Birch, Stewart, Kolasch and Birch

[57] ABSTRACT

For a thin-film EL display panel which exhibits the hysteresis loop phenomenon in the applied voltage versus brightness relationship, a string of alternating sustain pulses are applied, the amplitude of which is chosen at the voltage level appearing at the point in the hysteresis loop characteristics where the difference between the minimum light brightness on the voltage increasing curve and the maximum light brightness on the voltage decreasing curve is substantially a maximum. A flash lamp, for example, a xenon lamp which releases light beams toward the thin-film EL display panel, is energized in synchronism with the application period and pause period of the alternating sustain pulses. There are provided means for controlling the application period of the alternating sustain pulses and the illumination period of the flash lamp in accordance with the light activated write mode or erase mode. The light beams can be applied to the thin-film EL display panel via a film bearing an optical image to be written or erased.

9 Claims, 10 Drawing Figures

THIN-FILM EL DISPLAY PANEL WITH LIGHT-ACTIVATED WRITE AND ERASE MEANS

BACKGROUND OF THE INVENTION

The present invention relates to a method and device for exciting a three-layer structure thin-film EL display panel exhibiting the hysteresis loop phenomenon in the applied voltage versus brightness characteristics, and more particularly to a method for executing light-activated register and erasure on the thin-film EL display panel.

As discussed in U.S. Pat. No. 3,975,661 DRIVING METHOD FOR A THIN-FILM ELECTROLUMINESCENT ELEMENT OF A THREE-LAYER CONSTRUCTION assigned to the same assignee as this application, it was revealed that the three-layer structure thin-film EL display panel including a thin-film layer of electroluminescent material doped with active material serving as luminous centers, for example, ZnS:Mn sandwiched by a pair of dielectric layers such as $Y_2O_3$, exhibited the hysteresis loop phenomenon in the applied voltage versus brightness characteristics. Utilization of such hysteresis loop characteristics makes it possible to operate the EL display panel as a sort of memory function element and it is therefore free to write, sustain and erase any intelligence signal as a function of brightness of the EL element.

It is therefore an object of the present invention to provide an improvement in a circuit arrangement for driving the above described three-layer structure thin-film EL display panel. The present invention features a light-excited intelligence write mode and a light-excited intelligence erase mode.

BRIEF DESCRIPTION OF THE DRAWINGS

Other objects and many of the attendant advantages of the present invention will be readily appreciated as the same becomes better understood by reference to the following detailed description which considered in conjunction with the accompanying drawings in which like reference numerals designate like parts throughout the figures thereof, and wherein.

DETAILED DESCRIPTION OF THE INVENTION

The following first sets forth the hysteresis loop characteristics of a thin-film EL display panel and then the driving manner the inventors already proposed in the above referred patent to facilitate a understanding of the present invention.

Figure 1:
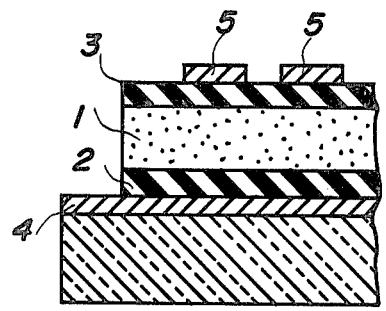
FIG. 1 is a cross sectional view of a thin-film EL display element used with the present invention.

FIG. 1 shows a cross sectional view of a three-layer structure ZnS:Mn thin-film EL display panel, which includes a ZnS thin-film layer 1 added with active material serving as luminous centers, for example, Mn, a pair of transparent dielectric layers 2, 3 such as $Y_2O_3$, a transparent electrode 4, a background electrode 5 such as Al, and a glass support 6. As seen from the drawing this EL display panel is adapted to sandwich the ZnS thin-film layer 1 between the transparent dielectric layers 2, 3 and exhibit the hysteresis loop characteristics with respect to brightness by a proper selection of materials and manufacturing conditions for the ZnS thin-film layer 1 or the transparent dielectric layers 2, 3.

Figure 2:
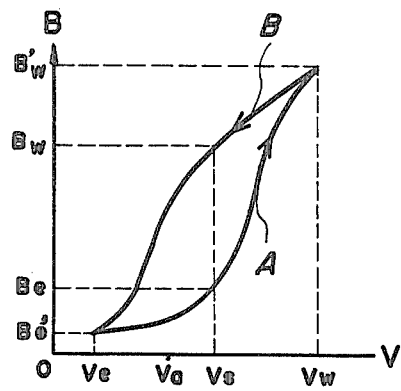
FIG. 2 is a graph showing the voltage versus brightness characteristics of the thin-film EL display element.

FIG. 2 is a graph showing the applied voltage versus light brightness of the ZnS thin-film EL display panel, with the amplitude V (peak value) of applied alternating voltage pulses as abscissa and light brightness B as ordinate. It is apparent from FIG. 2 that outstanding hysteresis loop characteristics lies in between the brightness on the applied pulse voltage increasing curve (denoted A) and that on the applied voltage decreasing curve (denoted B). Thus, provided that a string of alternating pulses Ps are applied to the EL panel the amplitude Vs (sustain voltage) is chosen at the point in the hysteresis loop where the difference between the minimum light brightness Be on the voltage increasing curve and the maximum light brightness Bw on the voltage decreasing curve is substantially a maximum, the EL panel will be held or sustained at a light brightness ranging from Be to Bw by means of the pulse string Ps. If the amplitude of the alternating pulses Ps is modulated and, for example, a higher write voltage Vw is applied to the EL panel in an instant, then the EL panel will emit light at a momentary brightness Bw' and subsequently settle at the write brightness Bw during application of the alternating sustain pulses. The EL panel, thereafter, goes on emitting light at the brightness Bw as far long as the alternating sustain pulses are supplied.

On the other hand, if the amplitude of the alternating sustain pulses Ps is further modulated while the panel is latched in the write state and, for example, a comparatively lower erase voltage Ve is applied, then the panel will be stable at the erase brightness Be after passing through a momentary erase brightness Be' for a brief period. The panel is latched in the erase state. A proper selection of the write and erase voltages Vw and Ve can offer the light emission at any intermediate brightness between Bw and Be. The driving method discussed above is disclosed and illustrated in detail in the above referenced patent. It is also known that the light-excited activation is applicable for the reason that the ZnS thin-film EL display panel is sensitive to externally applied light.

Figure 3:
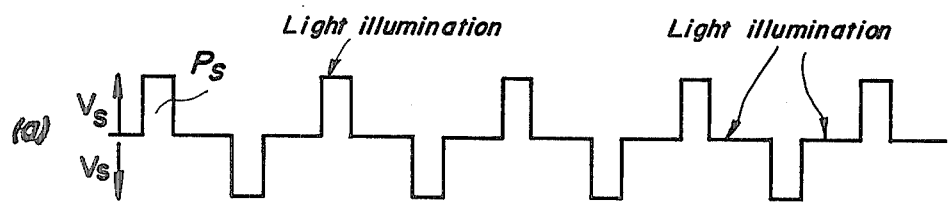
FIG. 3(a) is a time chart for illustration of the time relationship between alternating pulses Ps and light illumination.
FIG. 3(b) is a time chart for illustration of the relationship among the alternating pulses Ps, the light illumination and light brightness.
Figure 3:
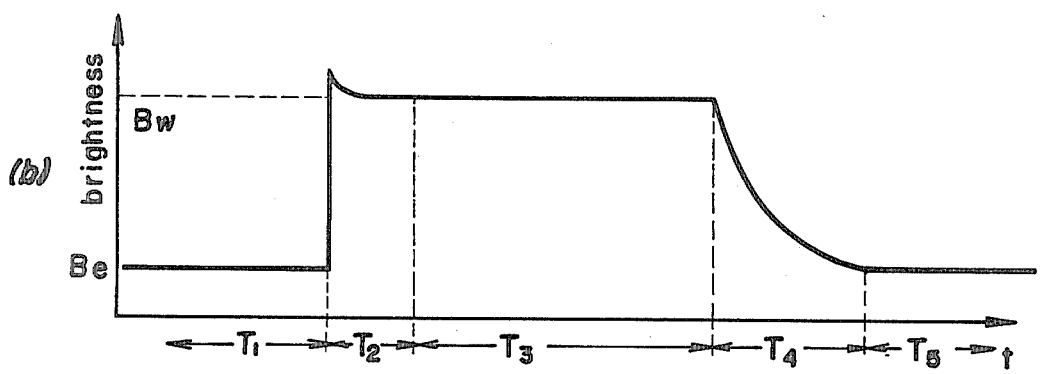

FIG. 3 is a time chart associated with the light-excited activation wherein the upper portion (a) thereof shows the waveform of applied voltage and the lower portion (b) thereof the waveform of light brightness.

Assume now that a string of the alternating pulses Ps are applied to the EL display panel with the amplitude (peak value) equal to the sustain voltage Vs and with a pulse pause period. The voltage or light-excited write mode has not been carried on yet and the panel is latched in the erase state with the brightness Be by means of the alternating sustain pulses Ps applied before the period $T_1$. When the panel is illuminated with externally applied light synchronous with the pulse period of the alternating sustain pulses Ps during the period $T_2$, the light brightness B will increase in accordance with incident light energy. As long as light illumination is long and strong enough, the panel will be latched throughout in the write state bearing the brightness Bw. Such write state will be held during application of the sustain pulses Ps even after light illumination is discontinued (the period $T_3$). Thereafter, if light beams are externally applied to the EL panel in synchronism with the pause period of the pulse string Ps as viewed from the period $T_4$, then the light brightness B will fall to an extent corresponding to incident light energy. Following enough light illumination the EL panel settles in the completely erase state, bearing the brightness Be. Such erase state will be thereafter kept as long as the sustain pulses Ps are supplied (the period $T_5$). The light illumination synchronous with the pause period of the pulses Ps is carried on for the purpose of erasure of intelligence signals on the EL panel.

The light-excited write and erase effects on the periods $T_2$ and $T_4$ depend mainly upon the length and the amount of incident light beams, namely, the strength of light energy. The brightness where the light-excited write and erase operations are carried on may assume any value within a range from Bw to Be by a proper selection of incident light energy, enabling half-tone write and erase operations. Though light illumination extends over the period of a pulse or a pause in the given example, it will be noted that it may extend over the period of a predetermined number of pulses or pauses. The light-excited write operation is believed to be caused by the light polarization effects of ZnS layer and the light-excited erase operation by the light depolarization effects.

Figure 4:
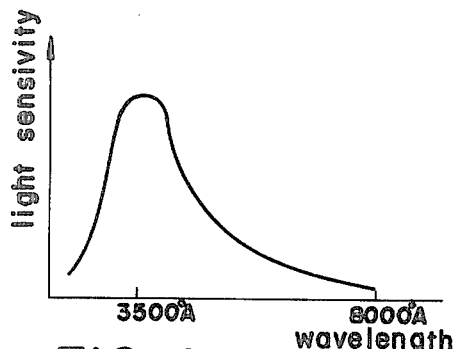
FIG. 4 is a graph showing the light-sensitivity characteristics of the thin-film EL display element.
Figure 5:
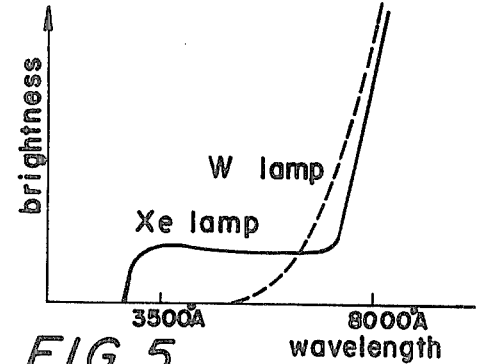
FIG. 5 is a spectral sensitivity chart of a tungsten lamp and a xenon lamp.

A graph showing the sensitivity of the thin-film EL display panel to the wavelength of incident light is depicted in FIG. 4, revealing that it has the maximum sensitivity at the wavelength of 3500Å. A source of light which contains mostly light beams with a wavelength of 3500Å is most desirable. There are two representative types of such light source commercially available in the market; a tungsten lamp and a flash lamp such as a xenon lamp. The wavelength characteristics of the two types of a lamp are illustrated in FIG. 5, indicating that a xenon lamp containing a considerable amount of light at a wavelength of 3500 Å is preferable over a tungsten lamp for the purpose of the light-excited write and erase operations for the EL display panel. In addition, to activate the EL display panel in the time relationship of FIG. 3, a tungsten lamp is very difficult to serve the needs of the EL display because of the slow response thereof. This is, in fact, because the EL display panel needs a sustain frequency higher than 100 Hz and a tungsten lamp is extremely difficult to turn on and off in 100 msec. A xenon flash lamp, on the other hand, more easily emits light in a substantially short period less than several msec., though depending upon capacitance of a charging capacitor. It is readily possible for a xenon lamp to release light in good time with the alternating sustain pulses. Moreover, a xenon lamp is better than a tungsten lamp from a standpoint of physical strength.

Figure 6:
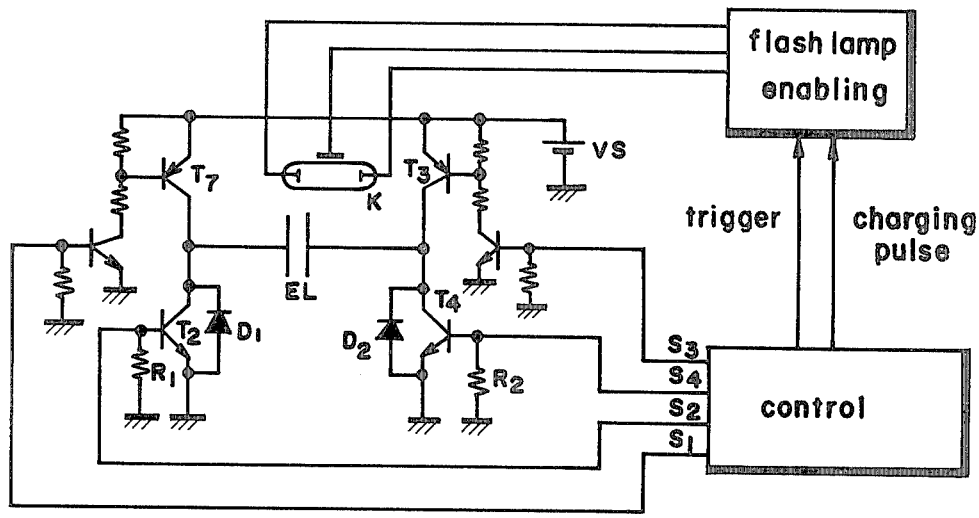
FIG. 6 is a circuit diagram of a circuit arrangement for driving the EL element and the xenon lamp according to the present invention.
Figure 7:
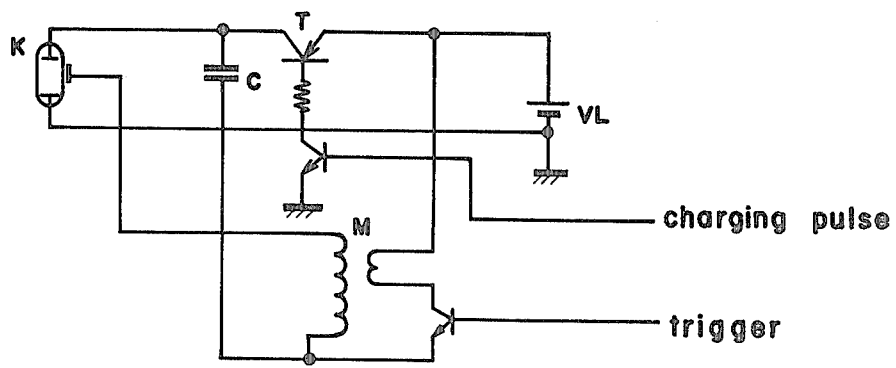
FIG. 7 is a circuit diagram of a xenon lamp.
Figure 8:
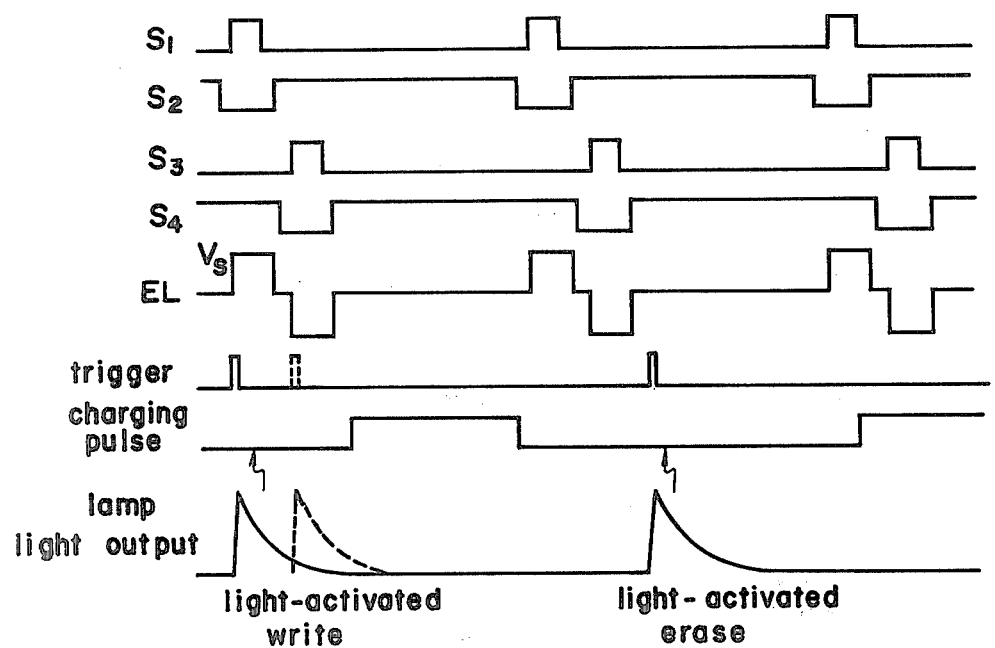
FIG. 8 is a time chart for illustration of operation of the circuit arrangement of FIG. 6.

FIG. 6 shows an example of a light-excited write and erase circuit utilizing the above discussed flash lamp for the EL display panel, FIG. 7 shows a flash lamp energization circuit and FIG. 8 shows a time chart associated with the circuit of FIG. 6. In FIG. 6, Vs denotes a source of the sustain voltage to be applied to the EL display panel, EL denotes the EL display panel, $T_1$ to $T_4$ denote switching transistors and $D_1$ and $D_2$ denote diodes. Ve in FIG. 7 denotes a voltage source used to energize the flash lamp. The circuit of FIG. 7 further includes a flash lamp energizing capacitor C, a high voltage trigger generating coil M, and a switching transistor T adapted to charge the capacitor C in a given time relationship. The switch T is preferably implemented with a transistor when light beams are to be released at a frequency higher than 10 Hz and the capacitor C is charged very quickly, although it may be merely a resistor when the interval of light emission is a little too long. A control circuit of FIG. 6 offers a proper time basis for application of the sustain pulses, energization trigger signals for the flash lamp and charging timing signals for the capacitor.

As viewed from FIG. 8, upon application of signals $S_1$, $S_2$, $S_3$ and $S_4$ the illustrative voltage is developed across the EL display panel, supplying the same with the sustain pulses. The diodes $D_1$, $D_2$ of FIG. 6 are enabled when the transistors $T_2$, $T_4$ are on the on state and the potential across the EL panel is fixed at the ground potential GND. For example, in the event that the signals $S_1$ and $S_4$ are "1" and the voltage Vs is applied across the EL panel and then the signal $S_1$ is reduced to "0" to turn off the transistor $T_1$, charge will still remain on the EL panel (the EL panel can be deemed as a kind of a capacitor). Subsequent to this, when the signal $S_2$ is "1" with the transistor $T_2$ on, the electrode of the EL panel at the side of the transistor $T_1$ (or $T_2$) is at the ground potential GND but the other electrode thereof at the side of the transistor $T_3$ (or $T_4$) is inclined to fall below the ground potential GND because of the remaining charge. At this time current flows through the diode $D_2$ so that the potential of the EL panel at the transistor $T_3$ (or $T_4$) is held at the ground potential GND and not below the ground potential. The diode $D_1$ prevents the other potential of the EL panel from falling below GND. Although the resistor $R_1$ (or $R_2$) and the base-to-collector path of the transistors can form a discharge circuit without the diodes $D_1$ and $D_2$, the potential condition across the EL panel in this instance (with the diode omitted) is less stable than in the case of having the diodes leading to the ground potential GND. If the EL panel is triggered at the point in time where the signal $S_1$ or $S_3$ assumes "1", the lamp is actuated to release light beams to complete the light-excited write operation upon application of the sustain pulses. Nevertheless, in this case the period of the lamp actuation may be longer than the period of the sustain pulses applied. Since the light-excited write operation is very sensitive as compared with the light-excited erase operation, the former can have priority in spite of a portion of the erase period overlapped with the write period. Even though the light actuation extends in part during the period of the ground potential GND, the effects of erasure can be scarcely expected. When $S_1$ and $S_3$ are both "0" or $S_2$ and $S_4$ are both "1", the EL panel is triggered and illuminated with light under the condition that no voltage is developed across the panel. This leads to the depolarization effects to complete the erasure operation. The charging pulses should be applied immediately after the trigger pulses without overlapping therewith. An upper limit of the repeated actuation frequency is determined by specification of the flash lamp and the charging rate of the charging switch T. The satisfactory results were obtained with an EL actuation frequency of 500 Hz, Vs of 200 V, $V_L$ of 250 V, C of 10 μF, a turn ratio of M of 80:1, a flashing frequency of 40 Hz, a width of the charging pulse of 30 ms. As noted earlier, it is freely possible to achieve the light-excited write and erase operations on the EL panel by driving the EL panel with the circuit of FIG. 6 and the flash lamp with the circuit of FIG. 7. When the switch T of FIG. 7 is turned on only once, the flash lamp is energized once. If the same is turned on many times, consecutive light release can be available so that only hand written pattern or character can be written or erased with well known penlight means.

Figure 9:
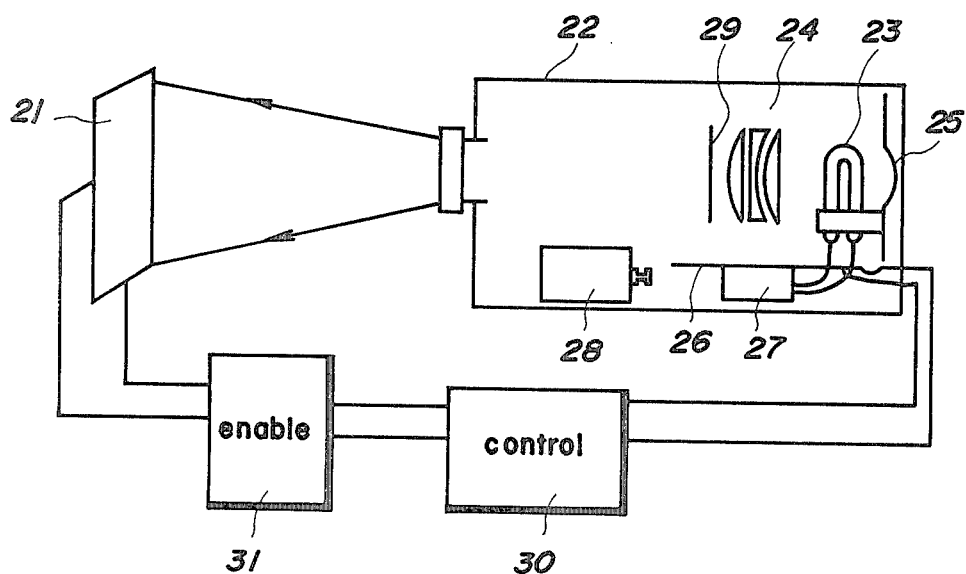
FIG. 9 is a schematic diagram of another embodiment of the present invention.

FIG. 9 shows another embodiment of the present invention wherein an optical image on a film can be written onto the thin-film EL display panel through utilization of the light-excited write operation. In FIG. 9, the thin-film EL display panel 21 has the above described device structure. A projector assembly 22 includes a flash lamp 23, a lens 24, a reflector 25, a circuit board 26 carrying a flash lamp actuation circuit, a trigger coil 27, a capacitor 28. It is desirable from the standpoint of the noise problem that the circuit board 26 be installed within the projector assembly 22. An image bearing film 29 has access to a light path within the projector assembly 22. A control circuit 30 is connected to the flash lamp actuation circuit board 26 and a thin-film EL display panel driver circuit 31 to create a trigger signal operatively associated with the sustain pulses and a charging pulse operatively associated with the flash lamp actuation. The driver circuit 31 develops the sustain pulses to be applied across the thin-film EL display panel and erase pulses to be used for completely erasing an image from the thin-film EL display panel.

Figure 10:
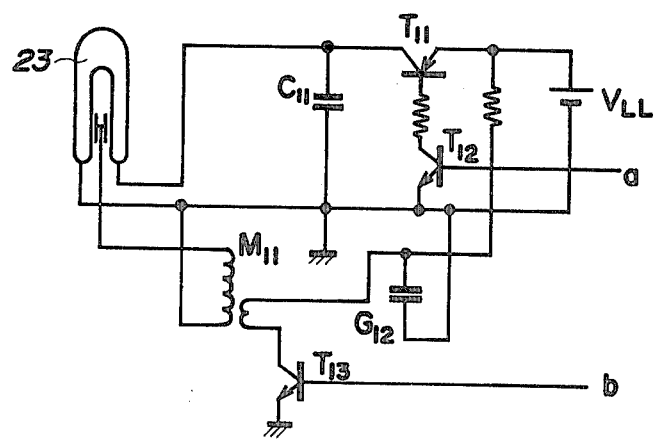
FIG. 10 is a circuit diagram of a flash lamp enabling circuit used with the embodiment of FIG. 9.

FIG. 10 shows a modification of the flash lamp enabling circuit, which comprises the flash lamp 23, a large capacitance capacitor $C_{11}$, a charging switch transistor $T_{11}$, a control transistor $T_{11}$ for the transistor $T_{12}$, a voltage source $V_{LL}$, a trigger coil $M_{11}$ with a turn ratio of 80:1, a trigger transistor $T_{13}$, a capacitor $C_{12}$, a charging pulse input terminal a and a trigger input terminal b.

In response to a signal applied from a manual switch (not shown), the control circuit 30 generates the trigger pulses synchronous with the pulse period of the sustain pulses, turning on the transistor $T_{13}$ via the terminal b to enable the flash lamp 23.

After completing the light emission operation of the lamp the control circuit 30 generates the charging pulses for one to two seconds to turn on the transistors $T_{11}$ and $T_{12}$ and charge the capacitor $C_1$. The circuit is ready for the next succeeding flash operation.

Since the light beams released from the flash lamp are synchronized with the pulse period of the sustain pulses, the image is written onto the thin-film EL display panel with three to four times enlargement by means of the projector assembly 22. The light beams from the flash lamp are modulated via the negative film 29 so that the image on the negative film (namely, the negative image) is light-excited and therefore written onto the thin-film EL display panel. The amount of the light beams is under the control of the negative film 29 so as to achieve the registration of half-tone images.

In the above illustrated embodiments, the light-excited erase is carried on while no sustain voltage pulse is applied across the EL panel and light beams are applied thereto. In this case light illumination with insufficient intensity makes it very difficult to achieve the erase operation completely. Upon application of the next succeeding sustain pulse the EL panel will go ahead to release light beams of a strength intermediate between the write brightness Vw and the erase brightness Ve.

In principle, the light-excited erase operation is carried on such that optically activated conduction of the ZnS layer depolarizes the charge accumulated on the interface. Insufficient light excitation, therefore, can neither depolarize nor sweep the conduction electrons, reducing a probability that these electrons are recaptured in the electron trap level within the ZnS:Mn layer.

To avoid this problem, light and, in addition, a bias voltage are applied during the light-excited erase operation such that the light depolarization effects are carried on under the condition that the conduction electrode accelerate readily. This expedites the sweeping of the conduction electrons and enhances the erase effects. A bias voltage Va of FIG. 2 is thus applied concurrently with the light-excited erase operation. The bias voltage Va may be either synchronized with the light illumination or a d.c. voltage. The bias voltage may be selected within a range from 10 V to 200 V.

The invention being thus described, it will be obvious that the same may be varied in many ways. Such modifications are not to be regarded as a departure from the spirit and scope of the invention, and all such modifications are intended to be included within the scope of the following claims.

What is claimed is:
1. A display device comprising:
a thin-film EL display panel exhibiting a light brightness effect when excited by an applied voltage, said El display panel further exhibiting a hysteresis loop phenomenon when said applied voltage is plotted on X and Y coordinate axes with respect to said light brightness;
means for applying to said thin-film EL display panel a string of alternating fixed amplitude sustain voltage pulses the voltage amplitude of said sustain pulses being chosen at the voltage level appearing at the point in the hysteresis loop characteristics such that the difference between the minimum light brightness on the voltage increasing curve and the maximum light brightness on the voltage decreasing curve is substantially a maximum; and
flash lamp means for releasing light beams toward said thin-film EL display panel, said light beams being released in synchronism with the application period and pause period, respectively, of said alternating sustain pulses, said flash lamp means releasing a considerable quantity of light beams having a wave length of approximately 3,500 angstroms, whereby light excited write and erase operations are performed on said thin-film EL display panel.
2. The display device as defined in claim 1 wherein said flash lamp means comprise a xenon lamp.
3. The display device as defined in claim 1 further comprising means for controlling the application period of the alternating sustain pulses and the illumination period of the flash lamp in accordance with the light-activated write or erase operation.

4. The display device as defined in claim 1 wherein a bias-voltage less than said sustain voltage is applied across said EL display panel when said light beams illuminate said EL display panel in synchronization with said occurence of the pause period of said alternating sustain pulses.

5. The display device as defined in claim 1 wherein said thin-film EL display panel comprises a pair of dielectric layers and a layer of electroluminescent material sandwiched between said pair of dielectric layers.

6. The display device as defined in claim 1 wherein illumination of said thin-film EL display panel with light when said panel is excited by said sustain voltage defines a light actuated write operation associated with said EL display panel whereas illumination of said display panel with light when said panel is not excited by said sustain voltage defines a light activated erase operation associated with said EL display panel.

7. A display device comprising:
a thin-film EL display panel which exhibits a light brightness effect when excited by an applied voltage, said EL display panel manifesting a hystersis loop phenomenon when said applied voltage is plotted on X/Y coordinate axes with respect to said light brightness;
means for applying to said thin-film EL display panel a string of alternating sustain pulses the amplitude of said sustain pulses being fixed and chosen such that the voltage level associated with the amplitude of said sustain pulses appear at a point in the hysteresis loop characteristics where the difference between the minimum light brightness on the voltage increasing curve and the maximum light brightness on the voltage decreasing curve is substantially a maximum; and
means for illuminating said thin-film EL display panel with light beams via an image bearing member said light beams illuminating said thin-film EL display panel in synchronization with the occurence of the application period or the pause period of said alternating sustain voltage pulses said light beam having a wavelength of approximately 3,500 angstroms thereby maximizing the sensitivity of said EL display panel to the incident light beams.

8. The display device as defined in claims 1 or 7 wherein said EL display panel comprises an electroluminescent layer, said layer comprising a $Z_nS$ thin-film layer doped with manganese.

9. A display device comprising:
a thin-film EL display panel exhibiting a light brightness effect when excited by an applied voltage, said EL display panel characterized by the illustration of a hysteresis loop characteristic when said applied voltage is plotted on an X-Y coordinate system versus said light brightness;
sustain voltage pulse generating means for generating a plurality of fixed amplitude sustain voltage pulses;
flash lamp means for providing a series of light illuminating flashes in response to energization thereof, and for storing electrical energy needed for succeeding flashes;
control circuit means having an output means for energization of said flash lamp means for generating a plurality of trigger pulses triggering the initiation of the flash from said flash lamp means;
said control circuit means generating a series of control signals required for the excitation of said EL display panel by said plurality of sustain voltage pulses;
circuit switching means responsive to said sustain voltage pulse generating means and to said control signals from said control circuit means for switching from a first to a second switching state thereby allowing the energization of said EL display panel by said plurality of sustain voltage pulses;
said circuit switching means switching from said second switching state to said first switching state thereby disconnecting said EL display panel from the supply of said plurality of sustain voltage pulses;
said control circuit means generating one of said trigger pulses simultaneously with the switching of said circuit switching means to said second switching state thereby causing said flash lamp means to provide a flash simultaneously with the energization of said EL display panel by one of said plurality of sustain voltage pulses further causing the simultaneous energization of said EL display panel by one of said sustain voltage pulses and said flash from said flash lamp means; and
said control circuit means subsequently and consecutively generating one of said trigger pulses after the switching of said circuit switching means to said first switching state thereby causing said flash lamp means to provide a flash when said EL display panel is not energized by said plurality of sustain voltage pulses further causing the energization of said EL display panel by said flash from said flash lamp means without energization by one of said sustain voltage pulses from said sustain voltage pulse generating means.

* * * * *